United States Patent
Lee (10) Patent No.: US 12,229,706 B2
(45) Date of Patent: Feb. 18, 2025

(54) SYSTEMS AND METHODS FOR CONCEPT INTERVALS CLUSTERING FOR DEFECT VISIBILITY REGRESSION

(71) Applicant: Samsung Display Co., Ltd., Yongin-si (KR)

(72) Inventor: Janghwan Lee, Pleasanton, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 252 days.

(21) Appl. No.: 17/401,216

(22) Filed: Aug. 12, 2021

(65) Prior Publication Data

US 2022/0398525 A1     Dec. 15, 2022

Related U.S. Application Data (60) Provisional application No. 63/209,268, filed on Jun. 10, 2021.

(51) Int. Cl.
*G06Q 10/0639*     (2023.01)
*G06N 20/00*     (2019.01)
(Continued)

(52) U.S. Cl.
CPC ....... *G06Q 10/06395* (2013.01); *G06N 20/00* (2019.01); *G06Q 50/04* (2013.01);
(Continued)

(58) Field of Classification Search
CPC .............. G06Q 10/06395; G06N 20/00; G06T 7/0004; G06T 2207/20081; G06T 2207/30108
(Continued)

(56) References Cited

U.S. PATENT DOCUMENTS

| 8,868,985 B2 | 10/2014 | Hackstein et al. |
| 9,239,986 B2 | 1/2016 | Lin et al. |

(Continued)

FOREIGN PATENT DOCUMENTS

| CN | 111695482 A | 9/2020 |
| JP | 2021-022311 A1 | 2/2021 |
| WO | 2019/187297 A1 | 10/2019 |

OTHER PUBLICATIONS

A Novel Hybrid Machine Learning Algorithm for Limited and Big Data Modeling With Application in Industry 4.0" to Khayyam et al., Jun. 3, 2020 (Year: 2020).*

(Continued)

*Primary Examiner* — Charles Guiliano
*Assistant Examiner* — Po Han Lee
(74) *Attorney, Agent, or Firm* — Lewis Roca Rothgerber Christie LLP (57) ABSTRACT

Systems and methods for making predictions relating to products manufactured via a manufacturing process. A processor receives a plurality of input vectors associated with a plurality of output values and a plurality of time intervals. The processor clusters the plurality of input vectors based on the time intervals associated with the input vectors. The processor trains a machine learning model for each time interval of the plurality of time intervals, where the training of the machine learning model is based on the input vectors associated with the time interval, and the output values associated with the input vectors. The processor further trains a classifier for selecting one of the plurality of time intervals for input data received for a product. In one embodiment, the machine learning model associated with the time interval selected by the classifier is invoked to predict an output based on the input data.

16 Claims, 8 Drawing Sheets

(51) Int. Cl.
*G06Q 50/04* (2012.01)
*G06T 7/00* (2017.01)

(52) U.S. Cl.
CPC .. *G06T 7/0004* (2013.01); *G06T 2207/20081* (2013.01); *G06T 2207/30108* (2013.01)

(58) Field of Classification Search
USPC ........................................................ 705/7.41
See application file for complete search history.

(56) References Cited

U.S. PATENT DOCUMENTS

| | | | |
|---|---|---|---|
| 10,037,378 | B1 | 7/2018 | Kumar et al. |
| 10,810,513 | B2 | 10/2020 | Basel et al. |
| 10,867,246 | B1 | 12/2020 | Nguyen et al. |
| 2019/0205786 | A1* | 7/2019 | Shen ...................... G06N 20/00 |
| 2019/0303783 | A1 | 10/2019 | Utsumi et al. |
| 2019/0384255 | A1* | 12/2019 | Krishnaswamy .... G05B 23/024 |
| 2020/0151578 | A1 | 5/2020 | Chen et al. |
| 2020/0285997 | A1* | 9/2020 | Bhattacharyya ......... G06N 7/00 |
| 2020/0379454 | A1 | 12/2020 | Trinh et al. |
| 2021/0042570 | A1* | 2/2021 | Iskandar ............. G06F 11/3075 |
| 2021/0103812 | A1* | 4/2021 | Malhotra .............. G06F 16/285 |
| 2021/0157705 | A1* | 5/2021 | Kumano ................. G06F 17/18 |
| 2021/0256369 | A1* | 8/2021 | Ardel ..................... G06N 3/088 |
| 2021/0390455 | A1* | 12/2021 | Schierz .................... G06N 5/04 |
| 2022/0147669 | A1* | 5/2022 | Quanz .................... G06Q 10/04 |
| 2022/0292340 | A1* | 9/2022 | Gogoglou ................ G06N 3/08 |
| 2022/0398021 | A1* | 12/2022 | Dutta .................... G06F 3/0653 |
| 2023/0053175 | A1* | 2/2023 | Pack ................ G05B 19/41865 |
| 2023/0067026 | A1* | 3/2023 | Huts ..................... G06V 20/00 |

OTHER PUBLICATIONS

Altendeitering, Marcel, et al., "Scalable Detection of Concept Drift: A Learning Technique Based on Support Vector Machines," Procedia Manufacturing, vol. 51, 2020, pp. 400-407.

Kang, Seokho, et al., "Using Wafer Map Features to Better Predict Die-Level Failures in Final Test," IEEE Transactions on Semiconductor Manufacturing, vol. 28, No. 3, Aug. 2015, pp. 431-437.

EPO Extended European Search Report dated Oct. 7, 2022, issued in corresponding European Patent Application No. 22168227.1 (14 pages).

* cited by examiner

SYSTEMS AND METHODS FOR CONCEPT INTERVALS CLUSTERING FOR DEFECT VISIBILITY REGRESSION

CROSS-REFERENCE TO RELATED APPLICATION(S)

The present application claims priority to and the benefit of U.S. Provisional Application No. 63/209,268, filed Jun. 10, 2021, entitled "CONCEPT INTERVALS CLUSTERING FOR DEFECT VISIBILITY REGRESSION," the content of which is incorporated herein by reference.

This application is also related to U.S. application Ser. No. 17/327,618, filed May 21, 2021 entitled "SYSTEM AND METHOD FOR REASSIGNMENT CLUSTERING FOR DEFECT VISIBILITY REGRESSION," the content of which is incorporated herein by reference.

FIELD

One or more aspects of embodiments according to the present disclosure relate machine learning systems for predicting manufacturing defect levels in the presence of model drift.

BACKGROUND

The display industry has grown rapidly in recent years. As new types of display panel modules and production methods are deployed, and as product specifications tighten, it may be desirable to enhance equipment and quality-control methods to maintain production quality. For example, it may be desirable to have measures for detecting different levels of manufacturing defects. Accordingly, what is desired is a system and method for automatically predicting levels of manufacturing defects.

The above information disclosed in this Background section is only for enhancement of understanding of the background of the present disclosure, and therefore, it may contain information that does not form prior art.

SUMMARY

An embodiment of the present disclosure is directed to a method for making predictions relating to products manufactured via a manufacturing process. A processor receives a plurality of input vectors associated with a plurality of output values and a plurality of time intervals. The processor clusters the plurality of input vectors based on the time intervals associated with the input vectors. The processor trains a machine learning model for each time interval of the plurality of time intervals, where the training of the machine learning model is based on the input vectors associated with the time interval, and the output values associated with the input vectors. The processor further trains a classifier for selecting one of the plurality of time intervals for input data received for a product. In one embodiment, the machine learning model associated with the time interval selected by the classifier is invoked to predict an output based on the input data.

According to one embodiment, an input vector of the plurality of input vectors includes features extracted from trace data associated with a product of the plurality of products, and an output value of the plurality of output values indicate a level of defect in the trace data.

According to one embodiment, the time interval associated with the input vector corresponds to a time when the trace data was collected.

According to one embodiment, the time interval is a bounded time interval associated with a start point and an end point.

According to one embodiment, a first time interval of the plurality of time intervals maintains a first relation of the input vectors associated with the first time interval, to corresponding output values, and a second time interval of the plurality of time intervals maintains a second relation of the input vectors associated with the second time interval, to corresponding output value, wherein the first relation is different from the second relation.

According to one embodiment, the machine learning model associated with the first time interval is trained based on the first relation, and the machine learning model associated with the second time interval is trained based on the second relation.

According to one embodiment, the first relation is different from the second relation as a result of model drift.

According to one embodiment, each of the plurality of time intervals is identified by a label, wherein the classifier is trained to output the label of the time period based on features of the input data.

According to one embodiment, the machine learning model is a regression model for predicting a defect visibility level of a manufactured product.

An embodiment of the disclosure is also directed to a method for making predictions relating to products manufactured via a manufacturing process. According to this embodiment, the processor receives input data and predicts a time interval based on features of the input data. The processor identifies a machine learning model from a plurality of machine learning models based on the time interval predicted by the processor. The processor invokes the machine learning model to generate an output based on the input data.

According to one embodiment, the predicted time interval is a predicted time when the input data was collected.

According to one embodiment, each machine learning model of the plurality of machine learning models is associated with a different time interval.

According to one embodiment, the machine learning model is trained based on a relation of input vectors to output values, wherein the relation changes from time period to time period.

An embodiment of the present disclosure is further directed to a system for making predictions relating to products manufactured via a manufacturing process. The system includes a processor and a memory. The memory includes instructions that, when executed by the processor, cause the processor to perform: receiving a plurality of input vectors associated with a plurality of output values and a plurality of time intervals; clustering the plurality of input vectors based on the time intervals associated with the input vectors; training a machine learning model for each time interval of the plurality of time intervals, the training of the machine learning model being based on the input vectors associated with the time interval, and the output values associated with the input vectors; and training a classifier for selecting one of the plurality of time intervals for input data received for a product, wherein the machine learning model associated with the time interval selected by the classifier is invoked to predict an output based on the input data.

As a person of skill in the art should recognize, the claimed system and method for making predictions relating to products manufactured via a manufacturing process help address changing manufacturing conditions that may result in changing relationships between the input vectors and the output values.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

A manufacturing process, such as a mobile display manufacturing process, may acquire digital trace data during the manufacture of the mobile display product. Although a mobile display product is used as an example, a person of skill in the art should recognize that embodiments of the present disclosure may apply to manufacturing processes of other glass and non-glass products, including for example, the manufacturing of semiconductor wafer, display glass, Polyimide substrate, and/or the like.

Trace data may be collected via one or more sensors that may be placed, for example, on top of a conveyer belt that carries the product during production. The sensors may be configured to record a sensed activity as trace data. The sensors may be, for example, multiple temperature and pressure sensors configured to capture measurements of temperature and pressure in the manufacturing process, as a function of time. Each sensor may be sampled multiple times (e.g., every second or a few seconds for monitoring each glass, over a period of multiple glass manufacturing time). The trace data may also include images of the product such as, for example, spectroscopy images, microscopy images, thermal images, and/or the like.

Trace data may be analyzed to understand conditions that lead to certain manufacturing defects. Machine learning (ML) may be employed to analyze the trace data and predict an output (e.g. visibility level of a defect in the manufactured product). In this regard, traditional ML may employ regression techniques to map a set of input variables (X variables) to continuous-valued output variables (y variables).

One problem with traditional regression techniques is that they assume that the statistical properties of the input variable, and the relationship between the input and output variables, are static. However, in the real world, data may evolve over time. Relations in the input and output variables may also evolve over time. Thus, predictions of ML models trained in the past may become less accurate as time passes. Such changes in the input data and/or relations between input and output data may collectively be referred to as a model drift.

In a display manufacturing setting, model drift may occur when manufacturing conditions change. For example, a temperature sensor may be moved closer or further away from a manufactured display product, causing a different mapping between temperature values (x inputs) and prediction of fault or no fault (y output). Other changes in manufacturing conditions are also contemplated. Accordingly, it is desirable to have a system and method that uses machine learning to make predictions of manufacturing defects, where different ML models may be provided to account for model drift that may occur over time.

In general terms, embodiments of the present disclosure are directed to analyzing trace data of a manufacturing process for predicting a degree/level of defect (also referred to as defect visibility level) of the manufacturing process. A defective manufacturing process may result in a defective/faulty manufacturing part. Identifying potential defects of the manufacturing process may help improve quality control of the process, reduce manufacturing costs, and/or improve equipment uptime.

In some embodiments, the trace data is generated by one or more sensors over time. The trace data is provided to a concept intervals analysis system for predicting a defect visibility level. In some embodiments, the input trace data is provided by a plurality of the sensors as multivariate input data.

In some embodiments, the analysis system addresses varying manufacturing conditions that may result over time, which may change the relations that an ML model may use to map the input data (e.g. trace data) to the output data (e.g. predicted defect visibility levels). In one embodiment, the analysis system is configured to identify a time interval that maintains a singular relation (referred to as a concept) between the input data and the output data, and set the time interval as a concept interval or era. Hereinafter, the term time interval, concept interval, and era are used interchangeably. The analysis system may be configured to identify a preset number of such time intervals. In one embodiment, each time interval may be a bounded time interval associated with a start point (e.g. start date) and an end point (e.g. end date). The time intervals may have the same or different duration/range. The duration/range may depend on the amount of time in which the single concept/relation is maintained.

In one embodiment, the analysis system is configured to train a separate ML model (e.g. defect visibility regressor) for each concept interval based on the singular relation of the input to output data that is maintained for the interval. In this regard, the analysis system clusters the input data that is associated with the concept interval, into corresponding era clusters. In one embodiment, the input data is associated with the concept interval if the data was generated during the time period of the concept interval. The input data in each era cluster, along with the associated output values, may be used to train the ML model for the era.

In some embodiments, the analysis system includes an era classifier that is trained to predict the era to which an input data belongs. The various eras and associated ML models may be identified using era labels. The era label output by the era classifier may be used to select one of the plurality of ML models that has been trained for the associated era. In this manner, any set of input data associated with a product may be provided to the analysis system for classifying the era to which the input data belongs. Once the era is identified, the ML model for the era may be invoked to predict the defect visibility level of the product associated with the input data. In this manner, defect visibility levels may be inferred with minimized regression errors.

Figure 1:
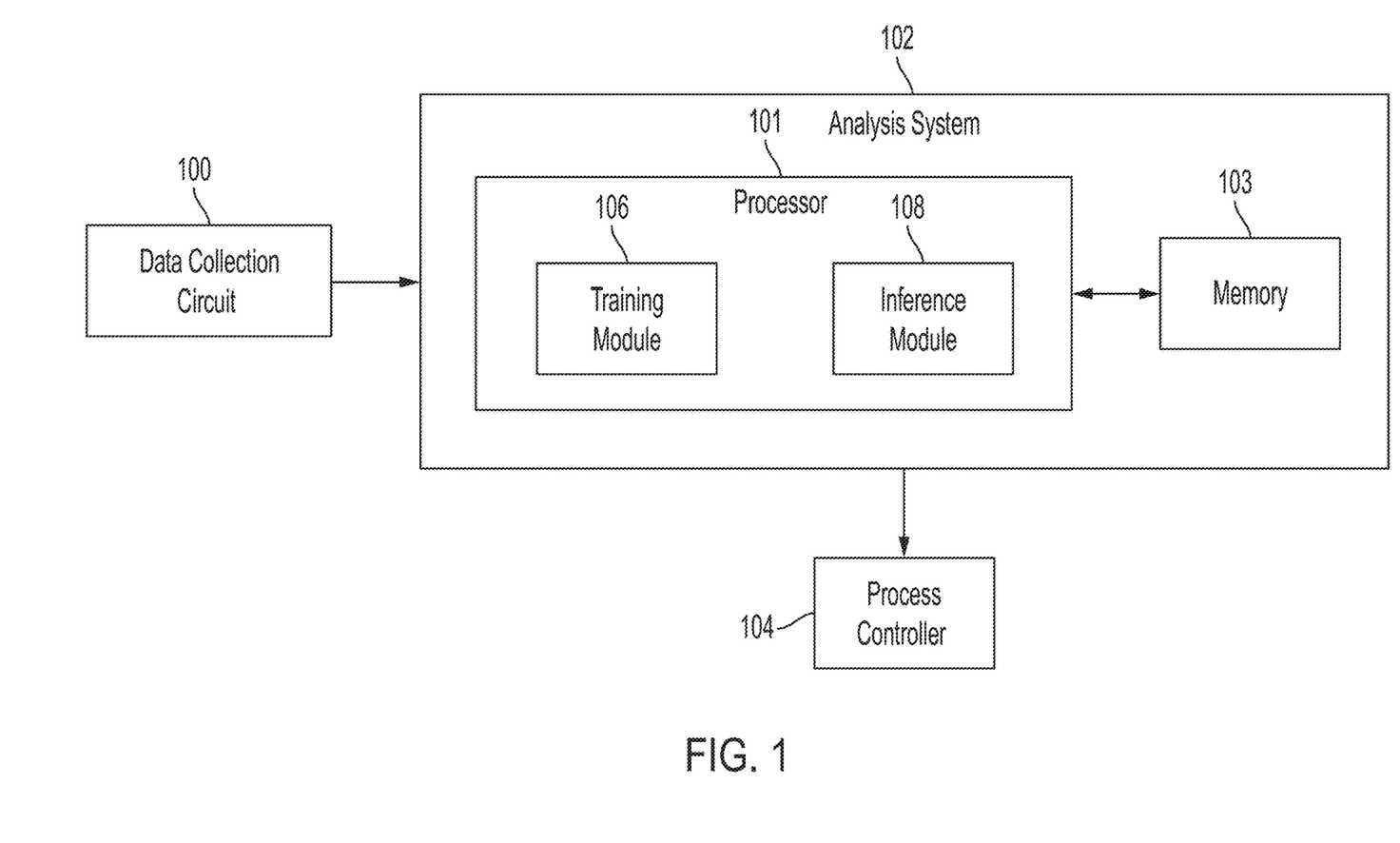
FIG. 1 is a block diagram of a system for making predictions relating to products manufactured via a manufacturing process, according to one embodiment.

FIG. 1 is a block diagram of a system for making predictions relating to products manufactured via a manufacturing process, according to some embodiments of the present disclosure.

Referring to FIG. 1, the system includes one or more data collection circuits 100, an analysis system 102, and one or more equipment/process controllers 104. The data collection circuits 100 may include, for example, sensors, amplifiers, and/or analog to digital converters, configured to collect trace data during a manufacturing process. The sensors may be placed, for example, on top of a conveyer belt that carries a product during production. The sensors may be configured to record any sensed activity as trace data. For example, the sensors may be multiple temperature and pressure sensors configured to capture measurements of temperature and pressure in the manufacturing process, as a function of time. Each sensor may be sampled multiple times (e.g., every second or a few seconds for monitoring each glass, over a period of multiple glass manufacturing time). The trace data may also be images of the product such as, for example, spectroscopy images, microscopy images, thermal images, and/or the like.

The analysis system 102 may include a training module 106 and an inference module 108. Although the training and inference modules 106 and 108 are illustrated as separate functional units in FIG. 1, a person of skill in the art will recognize that the functionality of the modules may be combined or integrated into a single module, or further subdivided into further sub-modules without departing from the spirit and scope of the inventive concept. For example, in some implementations, the training module 106 corresponds to one or more processing units (also referred to as a processor) 101 and associated memory 103. The inference module 108 may correspond to the same one or more processing units as the training module 106 or to a different one or more processing units. Examples of processing units include a central processor unit (CPU), a graphics processor unit (GPU), an application specific integrated circuit (ASIC), a field programmable gate array (FPGA), etc.

The training module 106 may be configured generate and train a plurality of machine learning models for use by the inference module 108. The plurality of machine learning models may be generated and trained based on training data provided by the data collection circuits 100.

In one embodiment, the training data includes trace data generated by the data collection circuits 100 at different time intervals, information on the time interval in which the trace data was generated, and associated output values indicating a defect level associated with the trace data. In one embodiment, features extracted from the trace data are provided to the training module 106 as input vectors. The training module 106 may be configured to cluster the input vectors into different concept periods based on the time interval in which the trace data was generated. Each concept period may be associated with an interval bound that defines a start and end of the concept period. Each concept period may be labeled with an era label/ID.

In one embodiment, the training module 106 is configured to train an ML model for each concept interval using the input vectors and associated output values that have been clustered into the corresponding interval. The ML model may be, for example, a regression model for defect visibility prediction. The trained ML models may be associated with the era label of the concept interval to which the ML model belongs.

According to some embodiments, the training module 106 is also configured to train an era classifier to identify the era for a received input data. In this regard, the input vectors that have been clustered into an era, and the corresponding era labels, are provided to the training module 106 for training the era classifier to classify the era to which a received input belongs.

The inference module 108 may be configured to predict a defect visibility level based on input data (e.g. trace data) associated with a product that is provided by the data collection circuits 100 during an inference stage. In this regard, the inference module 108 may be configured to invoke the trained era classifier to identify the era to which the input data belongs. The era label of the identified era may be used to identify the ML model trained for the identified concept interval. The identified ML model may then be used to make a prediction of the defect visibility level contained in the received trace data.

In some embodiments, the predicted defect visibility level is used for making an adjustment in the manufacturing process. For example, if the predicted defect visibility level is above a certain threshold level, a signal may be transmitted to the equipment/process controller 104 for adjusting a parameter of a manufacturing equipment used for the manufacturing process. The adjusted parameter may be, for example, an operating speed or internal temperature of the manufacturing equipment. In some embodiments, the manufacturing equipment may be reinitialized or recalibrated in response to detecting that the predicted defect visibility level is above the certain threshold level.

Figure 2A:
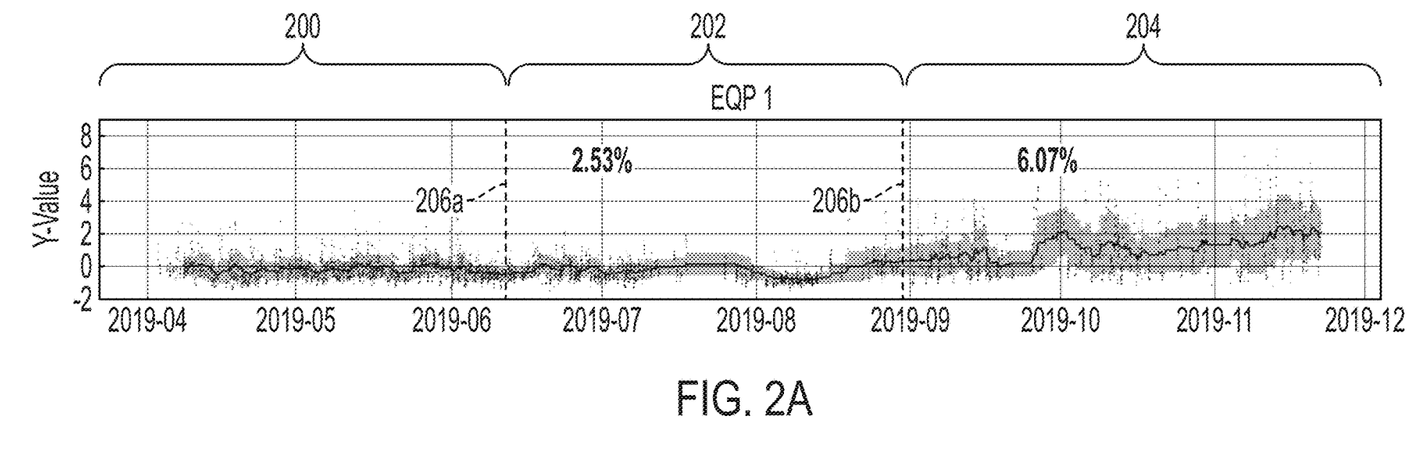
FIG. 2A is a graph of a first example of performance degradation of predictions made using conventional technologies.
Figure 2B:
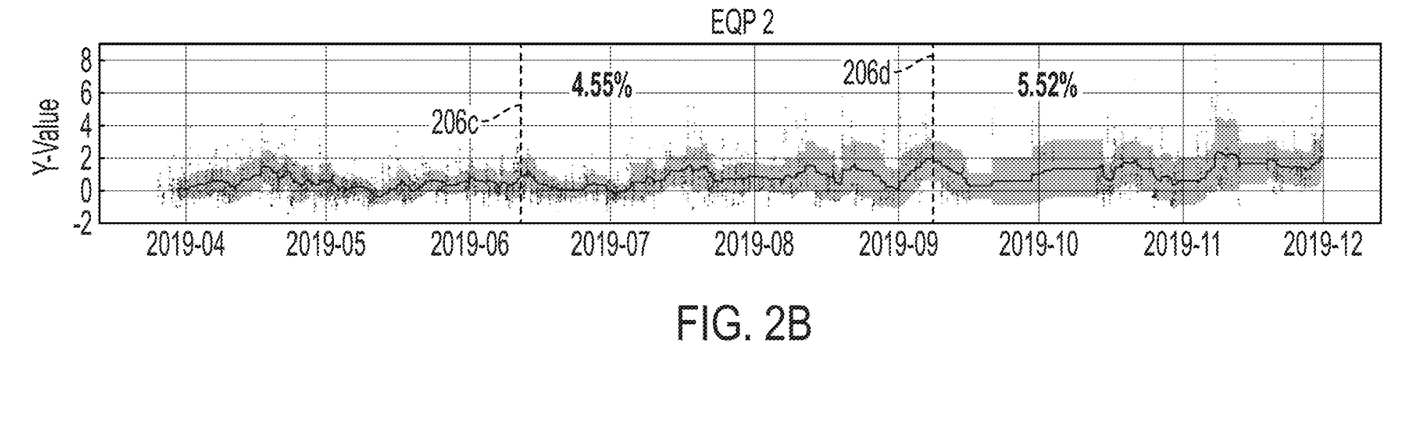
FIG. 2B is a graph of a second example of performance degradation of predictions made using conventional technologies.
Figure 2C:
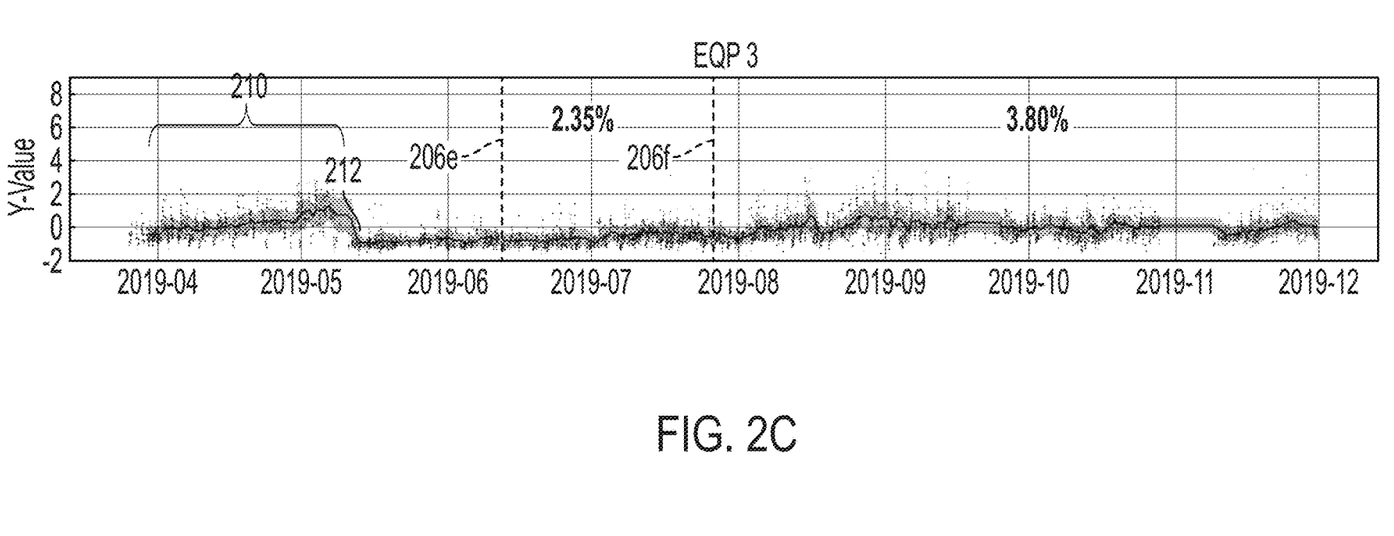
FIG. 2C is a graph of a third example of performance degradation of predictions made using conventional technologies.

FIGS. 2A-2C are graphs showing performance degradation of predictions made using conventional technologies. For example, a traditional ML model of FIG. 2A may provide accurate predictions in a first time interval 200, but the prediction accuracy may degrade over intervals 202 and 204, due to model drift, to cause prediction errors of respectively 2.53% and 6.07%. The prediction error by the traditional ML models of FIGS. 2B and 2C may also increase over time due to model drift.

In one example, model drift occurs when there is a change in a manufacturing condition that causes, for example, a change in the statistical properties of the output value/predictions. The change may occur during recalibration of one or more manufacturing equipment. The recalibration may happen periodically over time, on a regular or irregular basis. In one embodiment, the training module 106 may be configured to identify the points in time where recalibration occurs as change points 206a-206f (collectively referenced as 206). In one embodiment, the training module 106 identifies the time interval (e.g. interval 202) between two change points (e.g. 206a, 206b), where one of the change points (e.g. 206a) is identified as a start point of the time interval, and another one of the change points (e.g. 206b) is identified as an end point of the time interval. The identified time interval may be deemed to be a concept interval where a singular relation between input and output values may be maintained. The input values in the concept interval, along with the associated output values, may be used to train an ML model that is dedicated to the concept interval. Experiments depicted in Table 1 show that training a separate ML model for each identified time interval, in the presence of model drift, minimizes prediction errors when compared to a single ML model that covers all time periods. For example, experiments show a mean average percent error (MAPE) of 2.38%, 2.91%, and 1.94% provided by the current embodiment, which is lower than an MAPE of respectively 7.80%, 5.11%, and 4.63%.

TABLE 1

| MAPE* | EQP 1 | EQP8 | EQP 15 |
| --- | --- | --- | --- |
| Current Embodiment | 2.38% | 2.91% | 1.94% |
| Single ML Model | 7.80% | 5.11% | 4.63% |

Other mechanisms for automatically identifying different eras for training dedicated ML models are also contemplated. For example, the training module 106 may be configured to identify the change points 206 based on statistics of the input trace data or the output visibility training data. For example, the training module 106a may be configured to monitor the feature distribution of the input trace data, and identify points in time when the feature distribution deviates from a reference feature distribution by more than a threshold. The change points 206 may also be manually input by a system operator via an input device coupled to the training module 106a.

Figure 3:
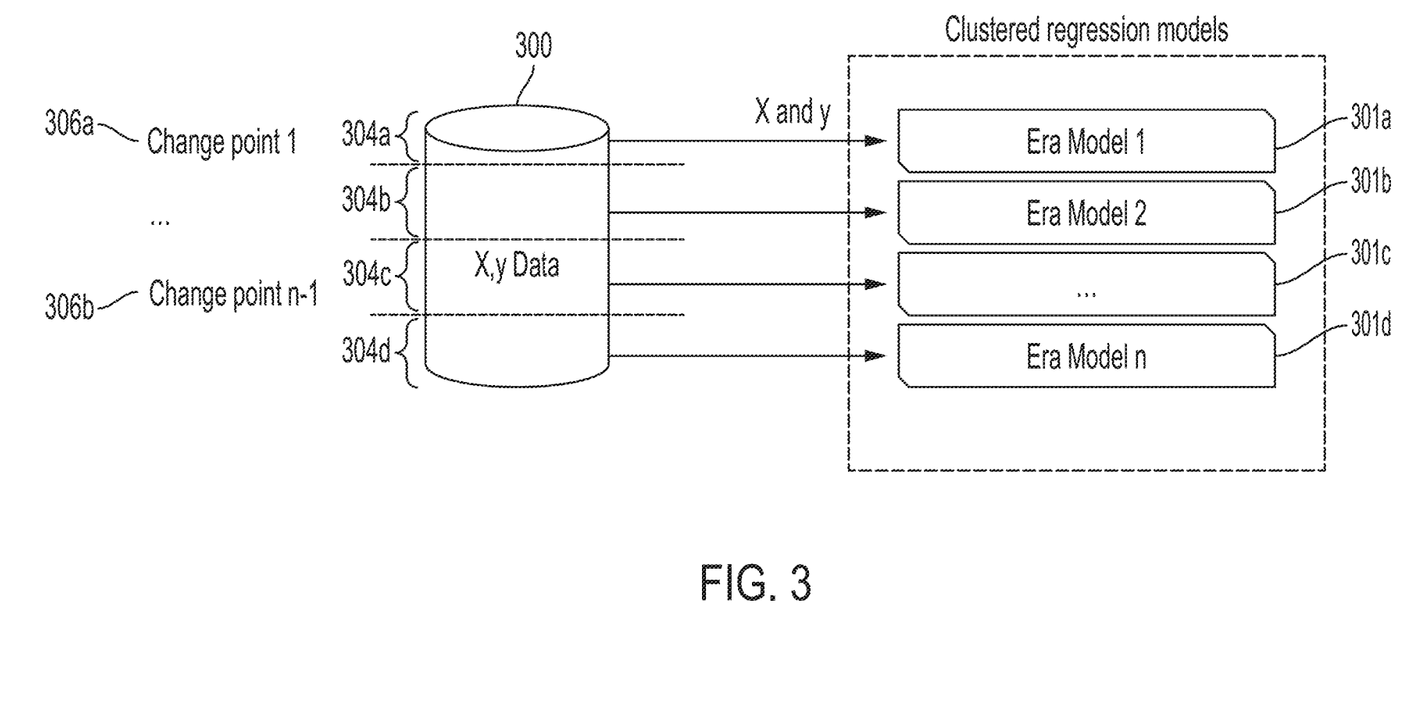
FIG. 3 is a block diagram of a training database and ML models trained for different time intervals according to one embodiment.

FIG. 3 is a block diagram of a training database 300 and ML models 301a-301d (collectively referenced as 301) trained for different time intervals 304a-304d (collectively referenced as 304) according to one embodiment. In the embodiment of FIG. 3, the training database 300 stores training data captured by the data collection circuits 100. The training data may include input X vectors generated based on the trace data collected by the data collection circuits 100, and associated output y values. In one embodiment, change points 306a-306b (similar to change points 206) demarcate each time interval 304 for which an X-y relation is maintained, before the relation changes for a different time interval. The change points 306a-306b may be set based on a received external indicator (e.g. recalibration time, manufacturing start/stop time, etc.), or set automatically by monitoring the input X and/or output y vectors.

In one embodiment, the training module 106 is configured to cluster the input X vectors based on the time intervals 304. In this regard, an input vector may be clustered into a particular time interval 304 if the trace data used to create the input vector was collected during the particular time interval. In one embodiment, the different time intervals 304 are identified by an era label.

In one embodiment, the input vectors and associated output values in each time interval 304 are used train a separate ML model 301. In this regard, the total number of ML models may correspond to the number of concept periods into which the input data is clustered. In one embodiment, the input vectors in one time interval maintain a singular relation to the output values. The ML model 301 for a particular time interval (e.g. ML model 1 for era 1) may be trained based on the singular relation maintained in the corresponding time interval (e.g. era 1). The relation may change from time interval to time interval. For example, the relation in era 2 on which ML model 2 is trained may be different from the relation in era 1.

In one embodiment, the number of time intervals 304, and hence, the associated ML models 301, is preset. In some embodiments, the changes in the relations occur cyclically, so that after the preset number of time intervals, the relations revert back to the relation in a prior time interval. For example, in the example graph of FIG. 2C, the prediction error at time period 210 is relatively high, but reverts to an initial low value at point 212 before it starts increasing again at change points 206e and 206f. In this regard, manufacturing conditions may have a limited number of states through process management. Thus, an assumption may be made that the manufacturing conditions (and associated relations) will revert to an original condition (and associated original relation) after a period of time. Thus, in one embodiment, the preset number of ML models generated for the different eras may suffice to address the model drift that may occur over time.

Figure 4:
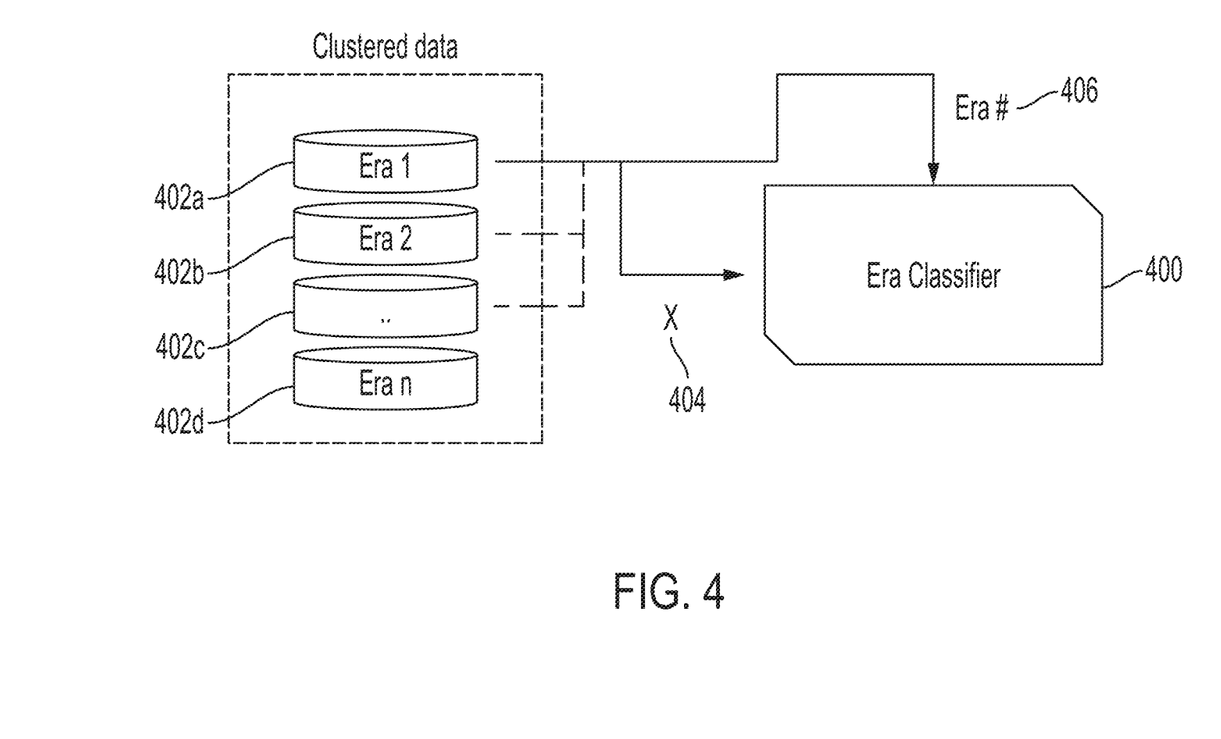
FIG. 4 is block diagram of an era classifier according to one embodiment.

FIG. 4 is block diagram of an era classifier 400 according to one embodiment. The era classifier may be implemented using logistic regression or any other classification algorithm such as, for example, decision tree, support vector machine, random forest, and/or the like. The era classifier 400 may be trained using the input X vectors 404 that have been clustered into corresponding eras 402a-402d (collectively referenced as 402), and the corresponding era labels 406. Once trained, the era classifier 400 may predict an era label for a received input data.

Figure 5:
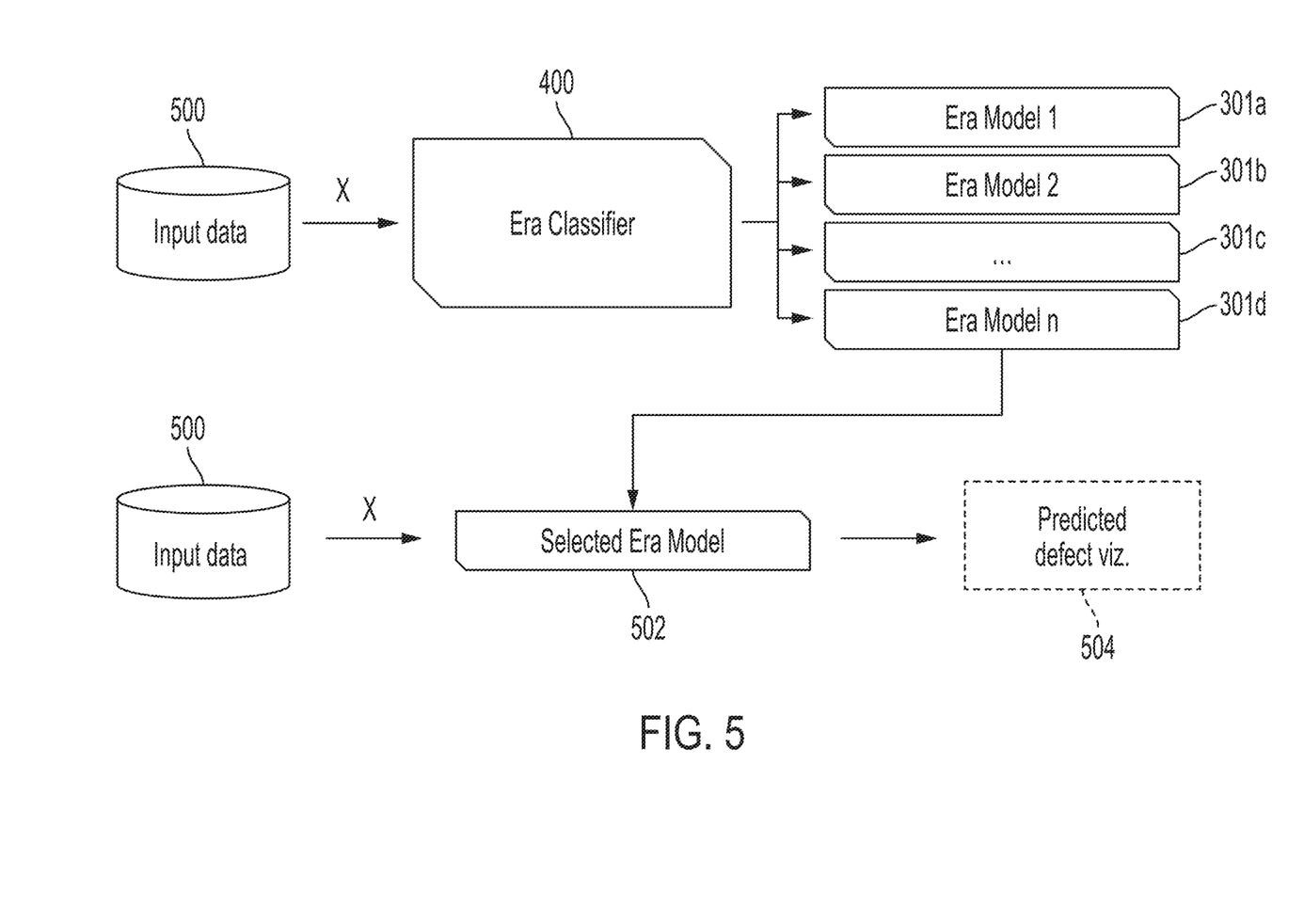
FIG. 5 is a block diagram of a trained era classifier and era ML models for making predictions of a defect visibility level associated with a product according to one embodiment.

FIG. 5 is a block diagram of the trained era classifier 400 and era ML models 301 for making predictions of a defect visibility level associated with a product according to one embodiment. The trained era classifier 400 receives input data 500 associated with a product for which a defect prediction is to be made. The input data 500 may be trace data (e.g. an image) collected by the data collection circuit 100. The era classifier 400 may output an era label of the time interval to which the input data 500 belongs.

In one embodiment, the era label output by the era classifier 400 is used to identify one of the various ML models 301 that have been trained for the various eras. The selected ML model 502 may then be invoked to make a prediction 504 of the defect visibility contained in the input data 500.

Figure 6:
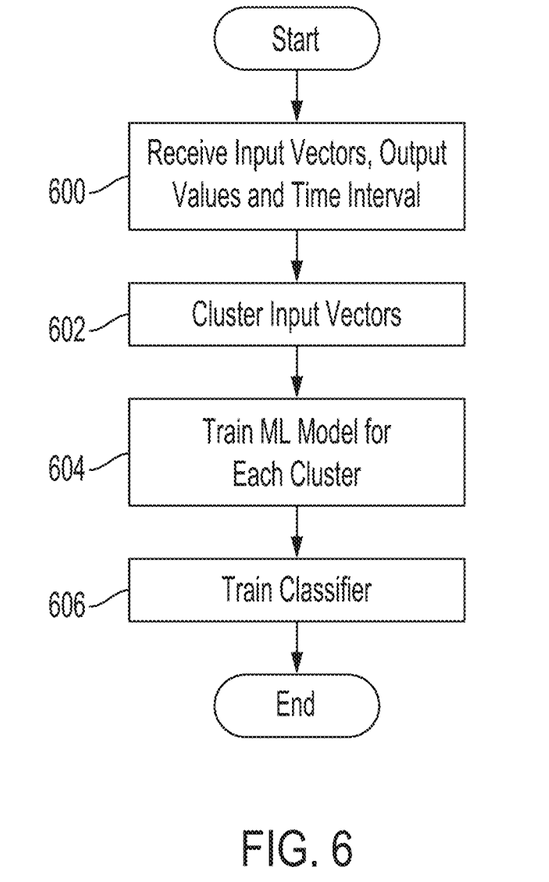
FIG. 6 is a process for training a system of making predictions of defect visibility level associated with a product according to one embodiment.

FIG. 6 is a process for training a system of making predictions of defect visibility level associated with a product according to one embodiment. It should be understood that the sequence of steps of the process is not fixed, but can be modified, changed in order, performed differently, performed sequentially, concurrently, or simultaneously, or altered into any desired sequence, as recognized by a person of skill in the art.

The process starts, and at block 600, the training module 106 receives input vectors generated based on trace data collected by the data collection circuits 100 of different products. Each input vector may include, for example, features of the corresponding product extracted from the trace data. In one embodiment, the trace data is collected at different time intervals. The time interval information is provided to the training module 106 for each input vector along with a corresponding output value.

At block 602, the training module 106 clusters the input vectors into different era clusters based on the time intervals associated with the input vectors. The time interval of each era cluster may be such that the relation between the input vectors and output values in the cluster is maintained during the time interval.

At block 604, a separate ML model is trained for each time interval. The ML model may be trained based on the input vectors in the associated era cluster, along with the corresponding output values. The ML model may be, for example, a regressor model. The ML model may associated with an era label of the time interval for which the ML model was trained.

At block 606, the training module 106 trains the era classifier 400 to identify an appropriate era to which an input data belongs. The training may be done using supervised learning. In this regard, the era classifier 400 is provided with input vectors and associated era labels for each time period of the preset number of time periods, and the era classifier learns the features of the input vectors associated with each time period for generating a corresponding era label.

Figure 7:
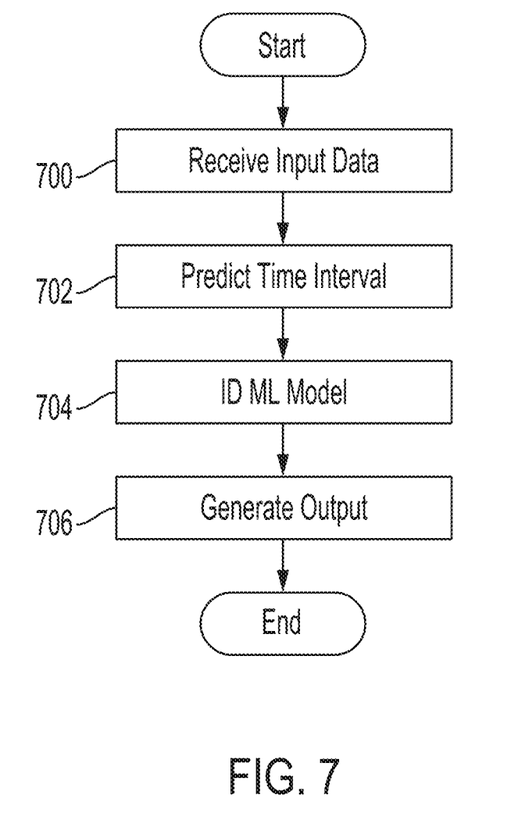
FIG. 7 is a process for making predictions of defect visibility level associated with a product according to one embodiment.

FIG. 7 is a process for making predictions of defect visibility level associated with a product according to one embodiment. It should be understood that the sequence of steps of the process is not fixed, but can be modified, changed in order, performed differently, performed sequentially, concurrently, or simultaneously, or altered into any desired sequence, as recognized by a person of skill in the art.

The process starts, and at block 700, the inference module 108 receives input data of a product for which defect prediction is to be made. The input data may be trace data captured by the data collection circuits 100 as multivariate input.

At block 702, the inference module 108 provides the input data to the era classifier 400 for classifying the time interval to which the input data belongs. In this regard, the inference module 108 may provide the input data as an input vector. The input vector may contain features of the product that are extracted from the input data. The era classifier 400 may predict an era label based on the features of the input vector.

At block 704, the inference module 108 may identify an ML model 301 based on the time interval predicted by the era classifier 400. In one embodiment, the era label of the predicted time interval may be used for selecting the corresponding ML model 301.

At block 706, the selected ML model 301 is invoked for generating an output based on the input data received at block 700. The output may be a value indicative of a predicted defect level of the product for which the input data corresponds.

In some embodiments, the systems and methods for concept intervals clustering for defect visibility regression discussed above, are implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for concept intervals clustering for defect visibility regression have been specifically described and illustrated herein, many modifications and variations will be apparent to those skilled in the art. Accordingly, it is to be understood that systems and methods for concept intervals clustering for defect visibility regression constructed according to principles of this disclosure may be embodied other than as specifically described herein. The disclosure is also defined in the following claims, and equivalents thereof.

What is claimed is:

1. A method for making predictions relating to products manufactured via a manufacturing process, the method comprising:
   receiving, by a processor, a plurality of input vectors associated with a plurality of output values and a plurality of time intervals;
   clustering, by the processor, a first set of input vectors of the plurality of input vectors into a first time interval of the plurality of time intervals, and a second set of input vectors of the plurality of input vectors into a second time interval of the plurality of time intervals;
   labeling the first time interval with a first label and the second time interval with a second label;
   training, by the processor, a first machine learning model for a first time interval of the plurality of time intervals, and a second machine learning model for a second time interval of the plurality of time intervals, the training of the first machine learning model being based on the first set of input vectors associated with the first time interval and first ones of the output values associated with the first set of input vectors, and the training of the second machine learning model being based on the second set of input vectors associated with the second time interval and second ones of the output values associated with the second set of input vectors;
   training, by the processor, a classifier machine learning model separate from the first machine learning model for selecting a time interval of the plurality of time intervals, wherein the training is based on the first set of input vectors, the second set of input vectors, the first label, and the second label;
   executing, by the processor, the classifier machine learning model based on input data received for a product, and receiving as output of the classifier machine learning model the first label of the first time interval into which the input data for the product is classified;
   selecting based on the first label the first machine learning model from among the first machine learning model associated with the first time interval and the second machine learning model associated with the second time interval; and
   executing, by the processor, the first machine learning model for predicting an output based on the input data.

2. The method of claim 1, wherein an input vector of the plurality of input vectors includes features extracted from trace data associated with a product of a plurality of products, and an output value of the plurality of output values indicate a level of defect in the trace data.

3. The method of claim 2, wherein one of the plurality of time intervals associated with the input vector corresponds to a time when the trace data was collected.

4. The method of claim 1, wherein the one of the time intervals is a bounded time interval associated with a start point and an end point.

5. The method of claim 1, wherein the first time interval of the plurality of time intervals maintains a first relation of the first set of input vectors associated with the first time interval, to corresponding output values, and the second time interval of the plurality of time intervals maintains a second relation of the second set of input vectors associated with the second time interval, to corresponding output value, wherein the first relation is different from the second relation.

6. The method of claim 5, wherein the first machine learning model associated with the first time interval is trained based on the first relation, and the first machine learning model associated with the second time interval is trained based on the second relation.

7. The method of claim 6, wherein the first relation is different from the second relation as a result of model drift.

8. The method of claim 1, wherein the classifier machine learning model selects the first label based on features of the input data.

9. The method of claim 1, wherein the first machine learning model is a regression model for predicting a defect visibility level of a manufactured product.

10. A system for making predictions relating to products manufactured via a manufacturing process, the system comprising:
    a processor; and
    a memory, wherein the memory includes instructions that, when executed by the processor, cause the processor to perform:
       receiving a plurality of input vectors associated with a plurality of output values and a plurality of time intervals;
       clustering a first set of input vectors of the plurality of input vectors into a first time interval of the plurality of time intervals, and a second set of input vectors of the plurality of input vectors into a second time interval of the plurality of time intervals;
       labeling the first time interval with a first label and the second time interval with a second label;
       training a first machine learning model for a first time interval of the plurality of time intervals, and a second machine learning model for a second time interval of the plurality of time intervals, the training of the first machine learning model being based on the first set of input vectors associated with the first time interval and first ones of the output values associated with the set of input vectors, and the training of the second machine learning model being based on the second set of input vectors associated with the second time interval and second ones of the output values associated with the second set of input vectors;
       training a classifier machine learning model separate from the first machine learning model for selecting a time interval of the plurality of time intervals, wherein the training is based on the first set of input vectors, the second set of input vectors, the first label, and the second label;
       executing, by the processor, the classifier machine learning model based on input data received for a product, and receiving as output of the classifier machine learning model the first label of the first time interval into which the input data for the product is classified;
       selecting based on the first label the first machine learning model from among the first machine learning model associated with the first time interval and the second machine learning model associated with the second time interval; and executing, by the processor, the first machine learning model for predicting an output based on the input data.

11. The system of claim 10, wherein an input vector of the plurality of input vectors includes features extracted from trace data associated with a product of a plurality of products, and an output value of the plurality of output values indicate a level of defect in the trace data.

12. The system of claim 11, wherein one of the time intervals associated with the input vector corresponds to a time when the trace data was collected.

13. The system of claim 10, wherein the one of the time intervals is a bounded time interval associated with a start point and an end point.

14. The system of claim 10, wherein the first time interval of the plurality of time intervals maintains a first relation of the first set of input vectors associated with the first time interval, to corresponding output values, and the second time interval of the plurality of time intervals maintains a second relation of the second set of input vectors associated with the second time interval, to corresponding output value, wherein the first relation is different from the second relation.

15. The system of claim 14, wherein the first machine learning model associated with the first time interval is trained based on the first relation, and the first machine learning model associated with the second time interval is trained based on the second relation.

16. The system of claim 15, wherein the first relation is different from the second relation as a result of model drift.

* * * * *